United States Patent

[11] 3,559,946

| [72] | Inventor | David W. Baxter, Jr.<br>Sylmar, Calif. |
|---|---|---|
| [21] | Appl. No. | 776,928 |
| [22] | Filed | Nov. 19, 1968 |
| [45] | Patented | Feb. 2, 1971 |
| [73] | Assignee | Bell Aerospace Corporation<br>a corporation of Delaware |

[54] BOND FOR METAL TO METAL JOINTS
3 Claims, 5 Drawing Figs.

[52] U.S. Cl. .................................................. 251/129,
29/521, 29/157.1, 251/359
[51] Int. Cl. .................................................. F16k 31/06,
B21k 25/00
[50] Field of Search .......................................... 251/363,
365, 360, 359, 129; 29/157.1, 521

[56] References Cited
UNITED STATES PATENTS

| 1,758,454 | 5/1930 | McWane | 29/521 |
| 2,038,124 | 4/1936 | Osborne | 29/521 |
| 2,757,945 | 8/1956 | Bingham | 29/521 |
| 3,322,090 | 5/1967 | O'Brien | 137/625.62X |
| 3,373,769 | 3/1968 | Chaves, Jr. | 251/129X |

FOREIGN PATENTS

| 21,566 | 0/1894 | Great Britain | 251/359 |

Primary Examiner—Arnold Rosenthal
Attorney—Nilsson, Robbins, Wills & Berliner

ABSTRACT: Disclosed is an electromagnetically operated force motor which positions a valve member with respect to a valve seat to open and close a valve, thereby controlling the flow of fluid through a chamber which is sealed with respect to the force motor. Various portions of the force motor are maintained in position by a mechanical bond which provides a fluidtight seal.

PATENTED FEB 2 1971 3,559,946
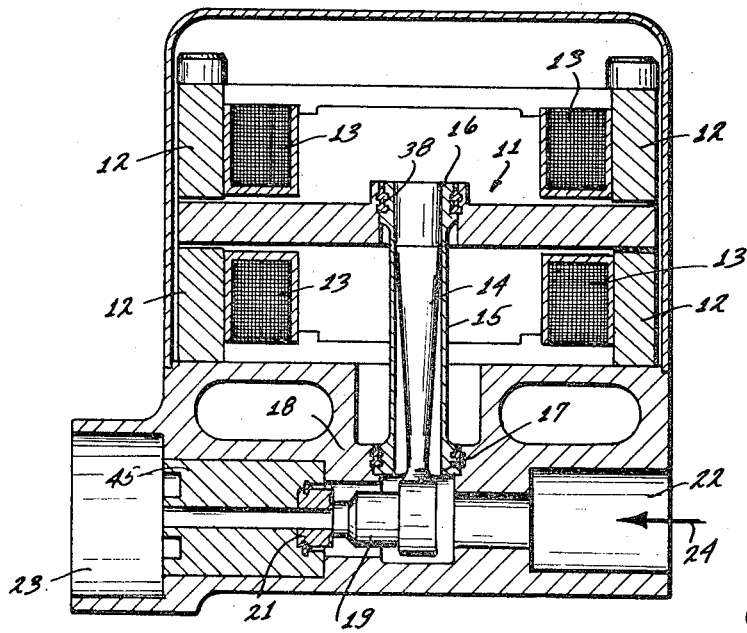
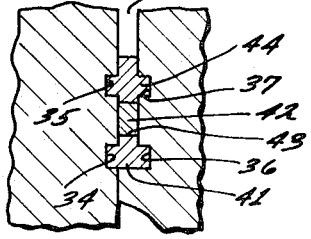
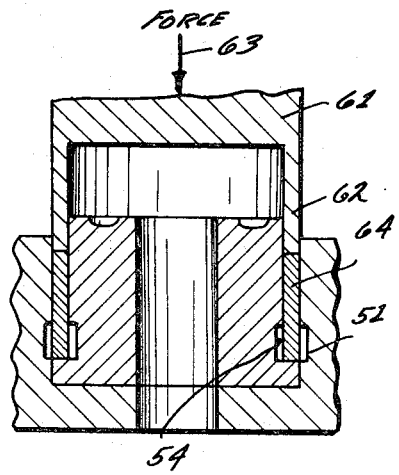
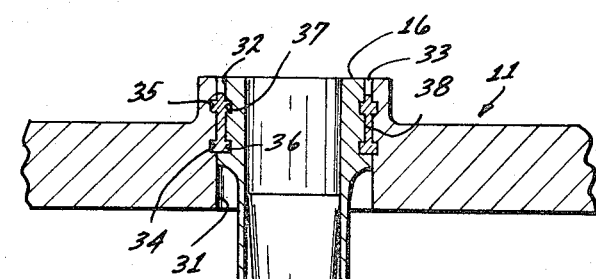
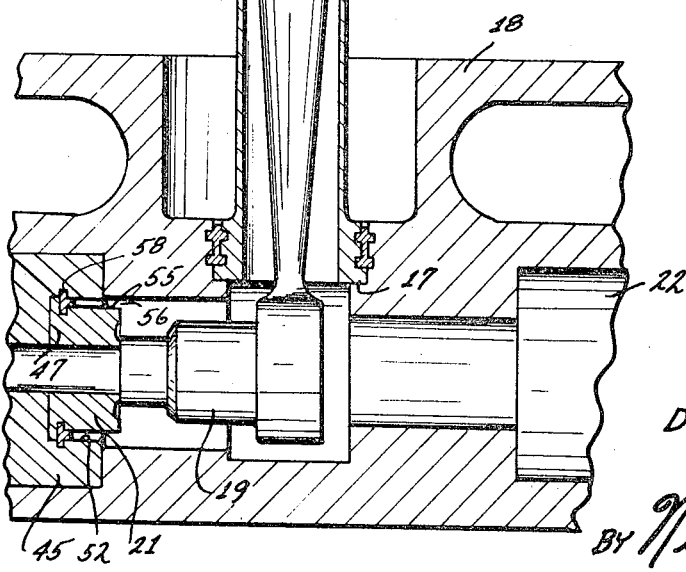
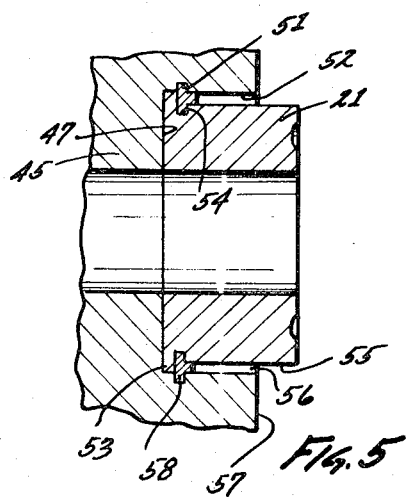
INVENTOR
DAVID W. BAXTER, JR.
BY *Nilsson + Robbins*
ATTORNEYS

BOND FOR METAL TO METAL JOINTS

BACKGROUND OF THE INVENTION

In controlling the flow of certain very corrosive and toxic fluids, such for example as hydrazine, it is necessary to provide valves having zero leakage throughout, including the valve seat and valve. To obtain the required finishes so as to meet the leakage specification, cemented carbide metals were used for seats and poppets. Typically, such seats and poppets are brazed in place. However, such corrosive fluids attacked and destroyed the brazing metal normally utilized. Electron beam welding was attempted and could not be used because of the great difference in melting temperature between the cemented carbides and the valve body material. Therefore, the normal metal processing techniques generally employed are not available.

SUMMARY OF THE INVENTION

First and second metallic members are provided each having first and second opposed continuous grooves formed therein and positioned in aligned relationship, the members being positioned in such a manner that they define a continuous unobstructed opening therebetween extending from the aligned grooves to a surface of one of the members, and a metallic insert is swaged into the grooves thereby to fill the same along with a portion of the continuous opening.

BRIEF DESCRIPTION OF THE DRAWING

FIG. 1 illustrates in cross section a valve structure formed in accordance with the present invention;

FIG. 2 illustrated, partly in cross section, a portion of the valve illustrated in FIG. 1;

FIGS. 3 and 5 illustrate in greater detail portions of the valve structure illustrated in FIG. 2; and FIG. 4 illustrates a method of forming a seal as illustrated in FIGS. 3 and 5.

DETAILED DESCRIPTION

Referring now to FIG. 1, there is generally illustrated in an elevational view in cross section an electromagnetically operated force motor for operating a poppet valve utilized for the control of highly corrosive fluids such as those above referred to. Such a valve includes an armature 11 positioned between pole pieces 12 which are actuated by coils 13 to which an electrical signal is applied from a source thereof (not shown). A flapper 14 is sealed to a flexure tube 15 at the upper end thereof and the flexure tube is in turn sealed at its upper end 16 to the armature. The lower end 17 of the flexure tube is sealed to the body 18 of the valve thereby causing the flexure tube to accomplish the functions of sealing the force motor from the remainder of the valve and also physically supporting the flapper 14. Affixed to the lower end of the flapper 14 is a poppet 19 which cooperates with a valve seat 21 to control the flow of fluid from a source thereof (not shown) through the valve into an input port 22 and out through the output port 23 in the direction as shown by the arrow 24. A valve of the type generally illustrated in FIG. 1, and briefly described above, is well known in the prior art, as illustrated, for example, by U.S. Pat. No. 3,373,769 and therefore detailed description will not be made thereof at the present time. As is discussed in U.S. Pat. No. 3,373,769 such a valve is capable of and is specifically designed for handling highly corrosive fluids of the type above referred to either in the form of single or dual poppet valves.

Although the present invention relates generally to such valves, it is specifically directed to the mechanical bonding which is employed in the construction thereof, such for example as bonding the valve seat 21 to the valve body, and bonding the flexure tube 15 to the valve body and to the armature. Such bonds are more fully illustrated in FIG. 2, to which reference is hereby made.

FIG. 2 shows the armature 11 defining an opening 31 into which the upper portion 16 of the tube 15 is inserted and fixed in place. Also the inner surface 31 of the armature 11 defines a pair of continuous grooves 34 and 35 therein. The outer surface 32 of the tube 15 also provides and defines a pair of continuous grooves 36 and 37. During construction, the tube 15 is positioned within the opening 31 so as to align the grooves 34 and 36 and also the grooves 35 and 37 in opposed position. The inner surface of the opening 31 and the outer surface 32 at the upper end of the tube 15 defines a continuous opening 33 therebetween starting at aligned grooves 34, 36 and continuing upwardly. An insert of metal 38 is then inserted into the opening 33 and is swaged or upset so as to fill the grooves as well as a portion of the opening 33. The insert 38 may be formed of various metals which are softer than the metals from which the armature 11 and the tube 15 are manufactured. For example, the metal 38 may be aluminum or tantalum.

Similar construction is utilized to mechanically bond the lower end 17 of the tube 15 to the housing 18. In some instances it is desirable to utilize two different inserts for filling the pairs of opposed grooves and such is illustrated in FIG. 3. As is therein shown, the grooves 34 and 36 are filled by a first metal insert 41 which is swaged so as to fill these two opposed aligned grooves as well as a portion of the opening 33. Thereafter, a hard metallic ring 42 is dropped into place so as to rest upon the upper portion 43 of the swaged metal insert 41. Thereafter, an additional metal insert 44 is swaged into place to fill the opposed grooves 35 and 37 and a portion of the continuous opening 33. It can be seen that the utilization of such a construction mechanically bonds the tube to the armature 11 and at the same time provides a gastight or fluid-tight seal, should such be desired. Similar such construction can be utilized if desired between the members 17 and 18 of the tube and housing respectively as above referred to.

As is also illustrated in FIG. 2, the valve seat 21 is held in place within a member 45 positioned within the body 18 in a manner similar to that above described. Such is more clearly illustrated in FIG. 5 which clearly shows the valve seat 21 positioned upon an inwardly directed shoulder 47. The member 45 defines a continuous outwardly directed groove 51 within the surface 52 thereof. The valve seat 21 defines an outwardly directed flange 53 which abuts the surface 52. An inwardly directed continuous groove 54 is defined by the surface 55 of the valve seat 21. The surface 55 of the valve seat 21 is smaller in diameter than the surface 52 defined by the member 45, thereby a continuous opening 56 is defined starting at the two grooves 51 and 54 and continuing upwardly to the upper surface 57 of the member 45. In sealing the seat to the member 45, the valve seat is inserted in place until the bottom thereof abuts the inwardly directed flange or shoulder 47, thereby positioning the continuous grooves 51 and 54 in opposed relationship. Thereafter a metallic insert 58 is inserted in the opening 56 and is swaged in place so as to totally fill the continuous grooves 51 and 54 and a portion of the opening 56.

The swaging may be accomplished, for example as shown in FIG. 4, by the utilization of a tool 61 having a downwardly directed continuous annular protrusion tube of a thickness to just fill the opening 56 and thereby when a force is applied as indicated by the arrow 63, sufficient to deform the metallic ring 64, the metal is forced downwardly so as to fill the grooves 51 and 54, thereby providing the structure as illustrated in FIGS. 1, 2 and 5.

One of the important features resulting from the structure manufactured in accordance with the present invention is that in the event the parts are not properly seated or a seal is improperly manufactured in the first instance, or there is a seal failure of one or more of the parts as a result of wear or otherwise, the swaged metal insert can be removed and the faulty part removed and replaced without destroying the entire valve mechanism. Such valve mechanisms are extremely expensive and such a possibility becomes extremely important. The swaged metallic insert may be eroded by a mechanical abrasive technique, such for example as providing a tube such as that illustrated in FIG. 4 with serrations at the end of the protrusion 62 which may be actuated until such a time as the metallic bond has been completely abraded through. Alternatively, should the swaged insert be constructed of aluminum, for example, the swaged material may be removed by applying a caustic solution to the aluminum so that the aluminum can be selectively attacked while not attacking the remaining portion of the valve.

I claim:

1. In a valve structure, a fluidtight seal between adjacent members comprising:
    a first metallic member having first and third continuous grooves formed therein;
    a second metallic member having second and fourth continuous grooves formed therein;
    said first and second grooves being positioned in aligned opposed relationship;
    said third and fourth grooves being positioned in aligned opposed relationship;
    said first and second members defining a continuous unobstructed opening therebetween extending from said grooves to a surface of one of said members; and
    first and second metallic insert means swaged into and filling said aligned first and second grooves, and said aligned third and fourth grooves respectively, and a portion of said continuous opening.

2. A fluidtight seal in a valve structure as defined in claim 1 wherein said metallic insert means includes a third insert sandwiched between said first and second inserts and being constructed of relatively hard material as compared to said first and second inserts.

3. An electrically operated valve comprising:
    1. a metallic body defining a cavity having an inlet port and an outlet port;
    2. at least one of said inlet and outlet ports including:
        a. an orifice in said body having an inwardly directed flange defining a continuous shoulder and an outwardly directed groove displaced longitudinally from said flange;
        b. an insert member defining an opening therethrough positioned within said orifice and defining an inwardly directed groove, said insert member seating against said shoulder whereby said grooves are in opposed aligned relationship; and
        c. a malleable metal filling said opposed grooves and providing a gastight seal between said body and said insert member;
    3. said orifice in said body and the outer surface of said insert member defining an unobstructed tubular opening extending from said malleable metal to the outer surface of said body;
    4. valve means disposed in said cavity for controlling the flow of fluid between said inlet and outlet ports; and
    5. an electrically operated force motor, sealed from said cavity and coupled to said valve means for operating the same.